United States Patent [19]
Ganguli

[11] Patent Number: 4,595,666
[45] Date of Patent: * Jun. 17, 1986

[54] CATALYST REJUVENATION PROCESS FOR REMOVAL OF METAL CONTAMINANTS

[75] Inventor: Partha S. Ganguli, Lawrenceville, N.J.

[73] Assignee: HRI, Inc., Gibbsboro, N.J.

[*] Notice: The portion of the term of this patent subsequent to Jun. 12, 2001 has been disclaimed.

[21] Appl. No.: 605,537

[22] Filed: Apr. 30, 1984

Related U.S. Application Data

[63] Continuation-in-part of Ser. No. 317,216, Nov. 2, 1981, Pat. No. 4,454,240.

[51] Int. Cl.[4] ............... B01J 21/20; B01J 23/94; B01J 23/92; C10G 1/06
[52] U.S. Cl. .................... 502/26; 208/422; 208/143; 423/68; 423/82; 423/150; 423/157; 502/25; 502/27; 502/28; 502/516
[58] Field of Search ............... 502/26, 27, 28, 516

[56] References Cited

U.S. PATENT DOCUMENTS

| | | | |
|---|---|---|---|
| 2,668,798 | 2/1954 | Plank | 502/27 |
| 2,704,281 | 3/1955 | Appell et al. | 502/27 |
| 3,220,956 | 11/1965 | Cramer et al. | 502/516 |
| 3,562,150 | 2/1971 | Hamilton et al. | 502/27 |
| 3,791,989 | 2/1974 | Mitchell et al. | 502/516 |
| 3,839,191 | 10/1974 | Johnson | 502/22 |
| 4,007,131 | 2/1977 | Gillespie et al. | 502/22 |
| 4,089,806 | 5/1978 | Farrell et al. | 502/26 |
| 4,267,032 | 5/1981 | Burk, Jr. et al. | 502/26 |
| 4,268,415 | 5/1981 | Mohan et al. | 502/516 |
| 4,301,125 | 11/1981 | Burkin et al. | 423/150 |
| 4,454,240 | 6/1984 | Ganguli | 502/26 |

Primary Examiner—P. E. Konopka
Attorney, Agent, or Firm—Fred A. Wilson

[57] ABSTRACT

Spent catalysts removed from a catalytic hydrogenation process for hydrocarbon feedstocks, and containing carbon undesired metals contaminants deposits, are rejuvenated for reuse. Following solvent washing to remove process oils, the catalyst is treated either with chemicals which form sulfate or oxysulfate compounds with the metals contaminants, or with acids which remove the metal contaminants, such as 5–50 W % sulfuric acid in aqueous solution and 0–10 W % ammonium ion solutions to substantially remove the metals deposits. The acid treating occurs within the temperature range of 60°–250° F. for 5–120 minutes at substantially atmospheric pressure, after which the rejuvenated catalyst containing carbon deposits can be effectively reused in the catalytic hydrogenation process.

9 Claims, 1 Drawing Figure

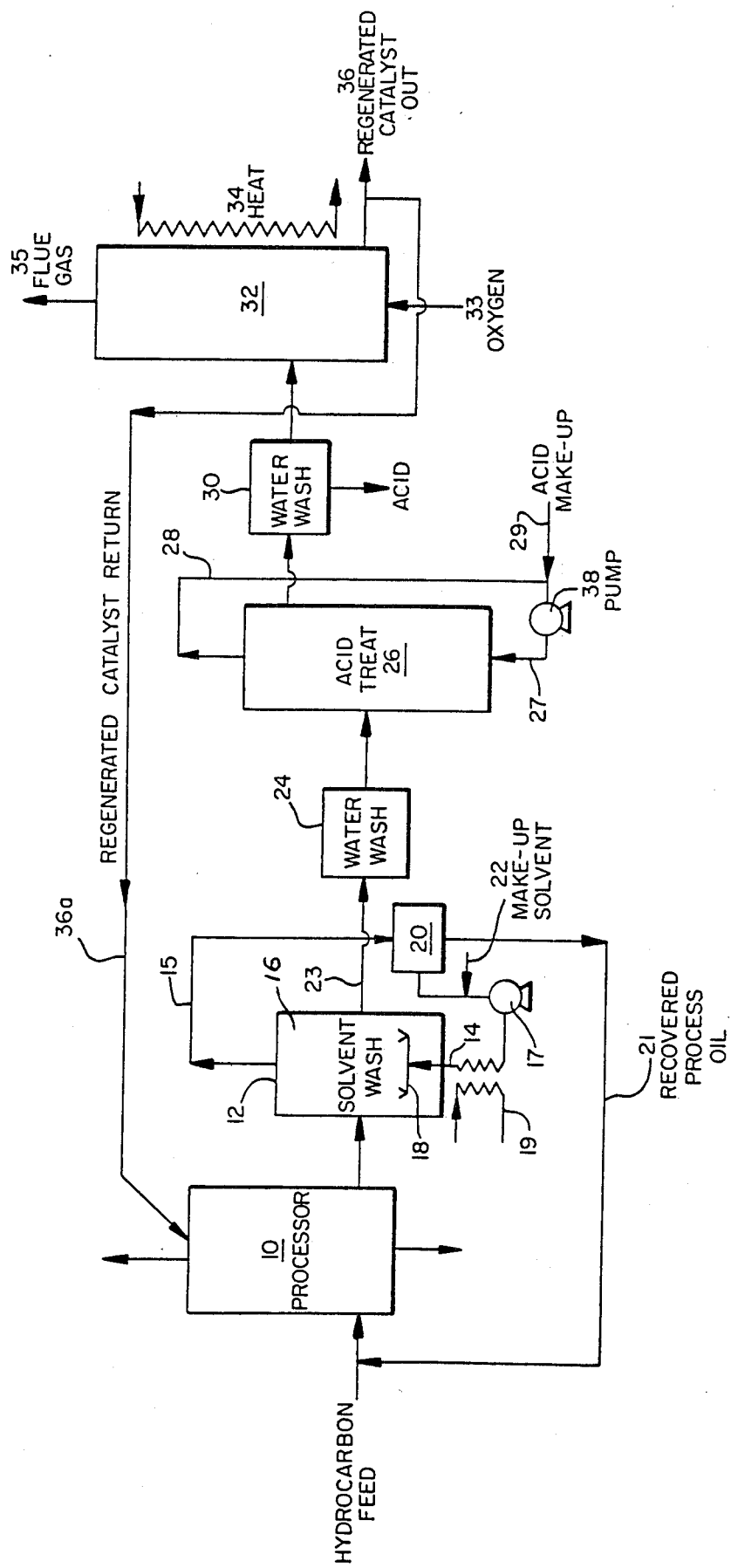

CATALYST REJUVENATION PROCESS FOR REMOVAL OF METAL CONTAMINANTS

CROSS-REFERENCE TO RELATED APPLICATION

This is a continuation-in-part-application of Ser. No. 317,216, filed: Nov. 2, 1981 now U.S. Pat. No. 4,454,240.

BACKGROUND OF INVENTION

This invention pertains to catalyst rejuvenation to remove deposited metal contaminants, and pertains particularly to a catalyst rejuvenation process for removal of such metal deposits from spent catalysts using a chemical treatment.

In coal catalytic liquefaction and hydrogenation processes, the used or spent catalyst gradually becomes contaminated by deposits of metals such as iron, titanium, calcium, sodium, silicon, etc. from the coal. These compounds form a crust around the exterior surface of the catalyst and thereby limit the diffusion of hydrocarbon molecules into the catalyst pores. Partial removal of these contaminants, particularly iron, titanium, calcium and sodium, is an essential step towards regeneration and reuse of the spent catalyst. Also, in catalytic hydroconversion processes for petroleum, tar sands bitumen, or shale oil, contaminants such as iron, nickel and vanadium are deposited on the catalyst and thereby reduces its activity appreciably, which requires catalyst replacement. Because of the high costs of such catalysts, processes to successfully rejuvenate the spent catalysts have been sought. Although some processes for carbon burnoff from used catalysts have been developed, suitable processes for the successful removal of deposited metal contaminants were apparently not available until now.

SUMMARY OF INVENTION

This invention discloses a catalyst rejuvenation process for substantial removal of metal contaminants deposits from used or spent catalysts, without appreciably affecting the active metal elements in the catalyst or its support material. In the process, spent catalyst is washed with a solvent to remove process oils, and is then treated with such chemicals that convert the contaminant metals to their respective sulfate or oxysulfate compounds, or with acids, such as dilute surfuric acid, which remove the metal contaminants, to remove the metal deposits from the catalyst particles. The treated catalyst is then washed to remove the acid and chemical compounds, and dried to remove surface liquid.

The term "catalyst rejuvenation", as used herein, means the removal of only metal deposits/contaminants from a spent catalyst to reactivate such catalyst for reuse in a catalytic process.

DESCRIPTION OF INVENTION

This invention provides a catalyst rejuvenation process which substantially removes metal contaminants deposits from the spent catalyst particles without damaging the active metal elements of the catalyst. In the process, the spent catalyst is first washed with a hydrocarbon solvent to remove the process oils, then is chemically treated preferably with an acid such as dilute sulfuric acid, at such conditions that convert the metal contaminants such as iron, titanium, calcium, sodium, silicon, vanadium, and nickel compounds deposited on the catalyst to their respective sulfate or oxysulfate compounds, but do not react appreciably with the active metal oxides such as cobalt, molybdenum in the catalyst or with the catalyst support material. These sulfate and oxysulfate compounds are then removed by dissolution in a suitable polar solvent, such as water. Useful chemical treating compounds for the solvent washed catalyst include ammonium peroxydisulfate and peroxysulfate compounds. Useful inorganic and organic acids include sulfuric acid, sulfonic acid, nitric acid, acetic acid, and citric acid, with 5-50 W % sulfuric acid in aqueous solution being preferred. The catalyst treating temperature used is within the range of 60°-250° F., and the treatment time is at least about 5 minutes and usually should not exceed about 120 minutes for effective removal of the metal deposits.

According to the invention, any of the following three catalyst treating procedures can be utilized:

1. Treatment of oil-free spent catalyst with 5-50 W % aqueous sulfuric acid solution at 60° to 250° F. temperature.
2. Treatment of oil-free spent catalyst with 5-50 W % aqueous sulfuric acid solution and 0-10 W % ammonium ion aqueous solution at 60° to 250° F.
3. Treatment of oil-free spent catalyst with 5-20 W % dilute aqueous solution of ammonium peroxydisulfate at mild operating conditions of 60°-150° F. temperature.

Procedures 1 and 2 can be used for removal of metals deposition from used catalysts removed from either coal or petroleum hydrogenation processes, whereas procedure 3 is used mainly for removal of nickel and vanadium deposits resulting from the hydroconversion of petroleum and other feedstocks containing such metal contaminants.

After removal of substantially all metal contaminant deposits from catalyst particles has occurred, the flow of acid or other treating liquid is stopped and the catalyst is then washed preferably with water to remove the acid. Suitable washing procedures include passing water upwardly through the catalyst bed, or using mechanical stirring while passing the water through the catalyst bed. The catalyst is then usually dried at moderate temperatures of 200°-300° F. The rejuvenated catalyst then can be returned to the hydrogenation process for resuse, thus reducing the amount of fresh make-up catalyst required in the reaction process.

The treated catalyst, before being returned to the hydrogenation process, may be further treated by carbon burnoff (i.e., regeneration). However, according to the present invention, the spent catalyst can be sufficiently reactivated without the carbon burnoff.

By the carbon burnoff procedure, the catalyst is passed to a carbon removal step, wherein it is heated to a temperature of 800°-805° F. in the presence of an oxygen-containing gas, such as 1-6% oxygen in an inert gas mixture, to effectively burnoff substantially all the carbon deposits.

This catalyst rejuvenation procedure is particularly useful for recovering used catalyst from a fluidized catalyst bed reaction system, e.g., H-Oil® and H-Coal® hydrogenation processes using ebullated bed reactors, from fixed catalytic bed reaction systems, and also from fluid catalytic cracking (FCC) processes. The preferred feedstocks are petroleum and coal. The rejuvenated catalyst has substantially the same activity as that of fresh catalyst.

By the term hydrocarbon as used herein, shall mean coal, shale oil, tar sand bitumen, petroleum and the like. The present process is for rejuvenating catalysts used for the upgrading of these hydrocarbons.

BRIEF DESCRIPTION OF THE DRAWINGS

The FIGURE of the drawing is a schematic flow diagram for catalyst rejuvenation and regeneration showing catalyst removal from a reaction process, followed by catalyst chemical treatment steps.

DETAILED DESCRIPTION OF INVENTION

As shown in the FIGURE of the drawing, used catalyst particles contaminated with deposited metal impurities such as iron, titanium, calcium, sodium, nickel and vanadium, are removed from a fluidized or fixed bed reaction process 10, such as from the catalytic hydrogenation of coal, petroleum, tar sands bitumen, or shale oil. The used catalyst is introduced as a batch into catalyst washing unit 12. This unit is supplied at 14 with a solvent liquid, which is circulated uniformly upwardly through a generally vertical column 16 by pump 17 and flow distributor 18. Heat is added to the solvent at 19 as needed to maintain the solvent temperature at near its boiling point, such as 200°–300° F., depending on the solvent used. Useful solvents are naphtha, toluene, and mixtures thereof. The pressure used is preferably atmospheric.

The solvent liquid containing some heavy process oil overflows at 15 and the process oil fraction is removed at 20 for return at 21 to the hydrogenation process 10. The remaining solvent liquid, along with make-up solvent at 22 as needed, is returned to the washing step 12. Following solvent washing at 12, the catalyst bed is usually heated to a temperature sufficient to drive off the remaining solvent, which is recovered.

The used oil-free catalyst is removed at 23 from washing unit 12 and next, preferably, washed at 24 with water to substantially fill the catalyst pores. The wet catalyst is next passed to acid treating column 26 and dilute sulfuric acid solution, containing 15–25% sulfuric acid, is introduced at 27 into the lower portion of the column 26. The resulting catalyst bed expansion is usually about 5–50 percent above its settled height. The acid treating vessel 26 is made corrosion-resistant, such as being lined with glass or ribber. The acid solution overflows at 28 and is recycled by pump 38 to the bottom of the vessel 26, along with make-up acid at 29 as needed to maintain the desired concentration therein. The acid treatment temperature is preferably 150°–200° F.

After such acid treatment to remove metal deposits has been completed, preferably within 10–30 minutes depending upon the amount of metal deposits on the catalyst particles, the chemicals or acid used, and temperature of the treatment, the acid-treated catalyst particles are removed and water washed at 30 to remove the acid.

In addition, the acid-treated catalyst next may (not necessarily) undergo a carbon burnoff treatment (i.e., regeneration) in a fixed or fluidized bed with an oxygen-containing combustion gas which is preferably introduced at the bottom as generally shown in the FIGURE. This regeneration step is accomplished in combuster 32 to remove substantially all carbon deposits by carbon burnoff, using a combustion gas having suitable low oxygen content, such as 1–6 V % oxygen, with the remainder inert gases introduced at 33. The combustion vessel 32 is thermally insulated to reduce heat loss and can have heat added at 34 as needed to help maintain the desired catalyst temperature.

The catalyst bed should be warmed slowly to dry the catalyst, after which the burnoff temperature should be at least about 800° F. The maximum allowable temperature in the catalyst bed is about 900° F. to avoid sintering damage to the catalyst substrate. Initially 5–10% air in nitrogen is passed over the heated catalyst bed. The burning front travels over the entire bed, with the temperature preferably maintained between 840° and 860° F. The air concentration in nitrogen is slowly increased to 30%, or to about 5% oxygen. The carbon burnoff procedure is continued until no carbon dioxide or carbon monoxide can be detected in the exit gas 35, which requires at least about 16 hours and usually not over 24 hours. The rate of gas flow for carbon burnoff should be 20–30 SCFH per 100 grams catalyst. The catalyst particles are removed at 36 and can be returned to the reaction process at 10 for reuse. Thus acid treatment of the spent catalyst followed by washing with or without the carbon burnoff provides an effective reactivated catalyst. The rejuvenated catalyst usually must be presulfided before reuse.

The invention will be further illustrated by reference to the following examples of catalyst rejuvenation by acid treatment and catalyst regenerated by carbon burnoff and with the acid treatment alone, and should not be construed as limiting the scope of the invention.

EXAMPLE 1

A quantity of 1/16 inch diameter extrudate spent catalyst removed from an ebullated bed reactor in an H-Coal hydrogenation process was washed in toluene solvent to remove the process oil. The catalyst was designated HDS-1442A and had characteristics as given in Table 1 below.

TABLE 1

| CHARACTERISTICS OF HDS-1442A CATALYST | | |
|---|---|---|
| | FRESH CATALYST | SPENT OIL-FREE CATALYST |
| Cobalt, W % | 2.4 | 1.68 |
| Molybdenum, W % | 9.15 | 6.28 |
| Carbon, W % | 0 | 16.7 |
| Bulk Density, lb/ft$^3$ | 36 | — |
| Pore Volume, cc/gm | 0.69 | 0.28 |
| Surface Area, M$^2$/gm | 339 | 128 |
| Crush Strength, lb/mm$^3$ | 3.0 | — |

A sample of the oil-free catalyst was placed in a container with 20% sulfuric acid in water solution. The catalyst and acid mixture was gently stirred and was maintained at about 180° F. temperature for about 20 minutes. Metals contained in the spent HDS-1442A catalyst (from H-Coal® process Run 130-82) before and after the acid treatment are provided in Table 2 below.

TABLE 2

| METALS IN OIL-FREE SPENT CATALYST, W % | | |
|---|---|---|
| Metals | Catalyst Before Acid Treatment | After Acid Treatment at 180° F. for 20 Minutes |
| Titanium | 1.93 | 1.28 |
| Iron | 0.32 | 0.11 |
| Calcium | 0.44 | 0.06 |
| Sodium | 0.79 | 0.07 |
| Molybdenum | 6.28 | 6.4 |
| Cobalt | 1.68 | 1.66 |

It is seen that the amount of titanium, iron, calcium and sodium metals deposited on the spent catalyst are substantially reduced by the acid treatment, while the molybdenum and cobalt originally contained in the catalyst remained essentially unchanged.

EXAMPLE 2

Metals in spent HDS-1442A catalyst from a similar H-Coal® Process (Run 130-88) before and after acid treatment are given in Table 3 below.

TABLE 3

METALS IN OIL-FREE SPENT AND TREATED CATALYST, W %

| Metals | Catalyst Before Acid Treatment | After Acid[1] Treatment at 70° F. for 2 hours | After Acid[2] Treatment at 180° F. for 45 minutes | After Acid[3] and Ammonium Ion Treatment at 180° F. for 45 minutes | After Acid[4] and Ammonium Ion Treatment at 180° F. for 20 minutes |
|---|---|---|---|---|---|
| Titanium | 2.4 | 1.9 | 2.15 | 1.63 | 1.84 |
| Iron | 1.25 | 0.32 | 0.28 | 0.25 | 0.19 |
| Calcium | 0.67 | 0.55 | 0.14 | 0.14 | 0.2 |
| Sodium | 0.76 | 0.31 | 0.2 | 0.16 | 0.14 |
| Molybdenum | 7.0 | 6.74 | 7.0 | 7.05 | 7.3 |
| Cobalt | 1.73 | 1.23 | 1.51 | 1.55 | 1.74 |

[1] 30 W % sulfuric acid
[2] 20 W % sulfuric acid
[3] 20 W % sulfuric acid and 0.15 W % ammonium ion
[4] 20 W % sulfuric acid 0.7 W % ammonium ion Based on the above Table 3 results, it is noted that the removal of metal deposits by acid treatment is more effective at temperatures of 180° F. than at ambient temperature (70° F.), while the cobalt and molybdenum active metals originally in the catalyst remain essentially unchanged. Also, it is noted from Table 3 that partial removal of titanium (Ti) can be increased by adding 0.1–1.0% ammonium sulfate to the sulfuric acid solution for treatment of oil-free spent catalyst.

EXAMPLE 3

A sample of spent catalyst was obtained from an H-Oil® operation on a petroleum feedstock (Run 130-96-8), and was washed with toluene solvent and then treated with 25% sulfuric acid solution at 190° F. for 20 minutes. The data results in Table 4 show that considerable amounts of vanadium and nickel deposits were removed, while the active elements molybdenum and cobalt in the catalyst were not appreciably affected. Further optimization of the operating conditions for acid treatment would result in even more effective removal of the vanadium and nickel contaminants.

TABLE 4

METALS IN OIL-FREE SPENT AND TREATED CATALYST, W %

| Metals | Catalyst Before Acid Treatment | Catalyst After Acid Treatment |
|---|---|---|
| Vanadium | 2.7 | 0.8 |
| Nickel | 1.01 | 0.48 |
| Molybdenum | 5.7 | 5.67 |
| Cobalt | 1.7 | 2.3 |

EXAMPLE 4

A quantity of 1/32 inch diameter extrudate spent catalyst removed from an ebullated bed reactor in a commercial H-Oil® hydrogenation process was solvent washed to remove the process oil. A sample of the oil-free catalyst was placed in a container with 20% sulfuric acid in water solution. The catalyst and acid mixture was gently stirred and was maintained at 170° F. temperature for about 20 minutes. Metals and carbon contained in the spent catalyst before and after the acid treatment are provided in Table 5 below.

TABLE 5

CARBON IN OIL-FREE SPENT CATALYST, W %

| | Nickel Total | Nickel* Excess | Molybdenum | Vanadium | Carbon |
|---|---|---|---|---|---|
| Before Treatment | 3.5 | 1.1 | 4.3 | 12.1 | 19.0 |
| After Treatment | 2.8 | 0.4 | 4.5 | 6.0 | 19.8 |

*Fresh catalyst contained nickel accounting for about 2.4 W % of the spent catalyst.

From the above results, it is seen that the amount of contaminant vanadium and excess nickel in the spent catalyst were reduced substantially by the acid treatment, while the molybdenum and carbon remained essentially unchanged.

EXAMPLE 5

Spent catalyst prepared by the solvent washing and acid treatment procedure of this invention was tested in a fixed catalyst bed bench unit for five days to evaluate activity of the catalyst. Fixed bed activity tests were also performed on the fresh catalyst material; on spent catalyst prepared by solvent washing, acid treatment with 20 W% sulfuric acid solution at 180° F. for 20 minutes and carbon burnoff; and on spent catalyst prepared by solvent washing and carbon burnoff. The hydrocarbon feedstock used during these catalyst activity tests was a high-metals-containing petroleum vacuum residue material. Results from these tests for days 2, 3, 4 and 5 are compared in Table 6 below.

TABLE 6

| 975° F. + VOLUME % CONVERSION OF FEED STOCK | | | | |
|---|---|---|---|---|
| Day | Fresh Catalyst | SW/AT[1] Catalyst | SW/AT/CB[2] Catalyst | SW/CB[3] Catalyst |
| 2 | 50–55 | 44–50 | 45–55 | 15–50 |
| 3 | 46–52 | 44–52 | 44–52 | 44–50 |
| 4 | 45–50 | 43–51 | 43–50 | 43–49 |
| 5 | 44–48 | 43–52 | 42–50 | 43–48 |

| DESULFURIZATION OF FEED STOCK (First Order Rate Constant, K, Bbl/day/lb.) | | | | |
|---|---|---|---|---|
| Day | Fresh | SW/AT | SW/AT/CB | SW/CB |
| 2 | 2.4–2.8 | 1.5–2.4 | 1.6–2.1 | 1.0–1.2 |
| 3 | 1.7–2.0 | 1.4–2.2 | 1.4–2.1 | 0.85–0.95 |
| 4 | 1.4–1.6 | 1.2–1.7 | 1.1–1.6 | 0.70–0.80 |
| 5 | 1.2–1.5 | 1.1–1.5 | 1.0–1.3 | 0.65–0.75 |

DEMETALLIZATION OF FEED STOCK

TABLE 6-continued

| | (Weight) | | | |
|---|---|---|---|---|
| 2 | 79–83 | 72–79 | 73–82 | 54–58 |
| 3 | 71–75 | 71–78 | 68–78 | 50–56 |
| 4 | 62–66 | 68–77 | 63–76 | 45–50 |
| 5 | 59–63 | 68–76 | 57–72 | 40–46 |

[1]SW/AT catalyst indicates prepared by solvent washing and acid treatment.
[2]SW/AT/CB indicates catalyst prepared by solvent washing, acid treatment, and carbon burnoff.
[3]SW/CB indicates catalyst prepared by solvent washing and carbon burnoff.

As can be seen from Table 6, the percent conversion, desulfurization and demetallization results using spent catalyst which has been prepared by either solvenyt washing and acid treatment or by solvent washing, acid treatment, and carbon burnoff compares well with fresh catalyst. The results using catalyst prepared by solvent washing and carbon burnoff compares favorably in 975° F.+ conversion, but not in heteroatom removal such as occurs in the demetallization and desulfurization reactions. Thus, it is noted that for the desulfurization and demetallization reactions, the used catalysts prepared by solvent washing and carbon burnoff alone has activity inferior to that of the catalyst prepared using solvent washing and an acid treatment step. Also, the catalyst prepared by solvent washing and acid treatment alone had activity essentially equivalent to that similarly prepared but using an additional carbon burnoff step.

I claim:

1. A catalyst rejuvenation process for removing metal contaminants of iron, titanium, calcium, sodium, vanadium and nickel from particulate hydrogenation catalysts used in coal liquefaction and petroleum residua conversion processes, comprising:
    (a) washing the used catalyst containing metals and carbon deposits with a hydrocarbon solvent to remove process oils;
    (b) treating the oil-free catalyst with an aqueous solution consisting of sulfuric acid solution and an ammonium ion which converts the metal contaminants to their respective sulfate compounds and at a temperature within the range of 60°–250° F. for at least about 5 minutes to remove the metal contaminants from the catalysts; and
    (c) washing the treated catalyst to remove the aqueous solution, thereby providing a rejuvenated catalyst containing substantially all the carbon deposits of the used catalyst.

2. The process of claim 1, wherein the aqueous solution used for treating the oil-free catalyst is 5–50 W % sulfuric acid and 0–10 W % ammonium ion.

3. The process of claim 1, wherein the used catalyst is removed from a coal liquefaction process and contains deposits comprising iron, titanium, calcium, and sodium, and said catalyst is treated with dilute sulfuric acid and ammonium ion solution at 60°–250° F. temperature for a time sufficient to remove the metal deposits from the catalyst.

4. The process of claim 1, wherein the used catalyst is removed from a petroleum residua conversion process and contains deposits of iron, vanadium and nickel, and said catalyst is treated with 5–50 W % sulfuric acid and ammonium ions solutions at 60°–250° F. temperature for a time sufficient to remove the metal deposits from the catalyst.

5. The process of claim 1, wherein the catalyst treating time is 5–120 minutes.

6. A catalyst rejuvenation process for removing metal contaminants of iron, titanium, calcium, sodium, vanadium and nickel from particulate hydrogenation catalysts used in a process for upgrading hydrocarbons, comprising:
    (a) washing the used catalyst containing metal and carbon deposits with a hydrocarbon solvent to remove process oils;
    (b) washing the oil-free catalyst with water to substantially fill the catalyst pores with water;
    (c) treating the catalyst having pores substantially water filled with an aqueous acid solution which removes the metal contaminants and at a temperature within the range of 60°–250° F. for at least about 5 minutes to remove metal contaminants from the catalyst; and
    (d) washing the treated catalyst with a polar solvent to remove the aqueous solution, thereby providing a rejuvenated catalyst containing substantially all the carbon deposits of the used catalyst.

7. The process of claim 6, wherein the oil free catalyst is treated with an acid selected from the group consisting of sulfuric, sulfonic, nitric, acetic and citric acids.

8. A catalyst rejuvenation process for removing metal contaminants of iron, titanium, calcium, sodium, vanadium and nickel from particulate hydrogenation catalysts used in a process for upgrading hydrocarbon feed materials, the process comrising;
    (a) washing the used catalyst containing metals and carbon deposits with a hydrocaron solvent to remove process oils;
    (b) treating the oil-free catalyst with a 5–10 W% aqueous solution of ammonium peroxydisulfate which converts the metal contaminants to their respective sulfate compounds at a temperature within the range of 60° to 150° F. for at least about 5 minutes to remove the metal contaminants from the catalyst; and
    (c) washing the treated catalyst to remove the aqueous solution, thereby providing a rejuvenated catalyst containing substantially all the carbon deposits of the used catalyst.

9. The process of claim 8, wherein said hydrocarbon feed materials are selected from the group consisting of, shale oil, tar sand bitumen and petroleum.

* * * * *